United States Patent
Vigren et al.

(10) Patent No.: US 11,455,503 B2
(45) Date of Patent: Sep. 27, 2022

(54) METHOD AND SENSOR APPARATUS FOR GENERATING AN OBJECT CLASSIFICATION FOR AN OBJECT

(71) Applicant: Axis AB, Lund (SE)

(72) Inventors: Andres Vigren, Lund (SE); Aras Papadelis, Lund (SE); Daniel Ståhl, Lund (SE); Arnab Bhattacharjee, Lund (SE)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 17/030,700

(22) Filed: Sep. 24, 2020

(65) Prior Publication Data
US 2021/0103781 A1 Apr. 8, 2021

(30) Foreign Application Priority Data
Oct. 3, 2019 (EP) ..................................... 19201236

(51) Int. Cl.
*G06K 9/62* (2022.01)
*G06N 3/04* (2006.01)

(52) U.S. Cl.
CPC ......... *G06K 9/6293* (2013.01); *G06K 9/6257* (2013.01); *G06N 3/0472* (2013.01)

(58) Field of Classification Search
None
See application file for complete search history.

(56) References Cited

U.S. PATENT DOCUMENTS

2006/0140449 A1* 6/2006 Otsuka ................. G01S 13/931
  382/104
2018/0172824 A1* 6/2018 Beckett .................. G01S 13/90
  (Continued)

FOREIGN PATENT DOCUMENTS

| EP | 3340103 A1 | 6/2018 |
| EP | 3422255 A1 | 1/2019 |
| WO | 2018/202552 A1 | 11/2018 |

OTHER PUBLICATIONS

Extended European Search Report dated Mar. 10, 2020 for the European Patent Application No. 19201236.7.
(Continued)

*Primary Examiner* — Tahmina N Ansari
(74) *Attorney, Agent, or Firm* — Volpe Koenig (57) ABSTRACT

Apparatus are provided for generating an object classification for an object, the apparatus comprising an image sensor, a radar sensor, and a processing unit, the processing unit configured to perform the steps of: receiving image data for the object from the image sensor, operating an image-based object classifier on the image data to generate an image-based object classification, receiving radar data for the object from the radar sensor, operating a radar-based object classifier on the radar data to generate a radar-based object classification, selecting between the image-based object classification and the radar-based object classification to output as the object classification for the object, determining if a training condition is met by the radar-based object classification, and training the radar-based object classifier using the image-based object classification when the training condition is met by the radar-based object classification.

19 Claims, 7 Drawing Sheets

(56) References Cited

U.S. PATENT DOCUMENTS

2019/0339706 A1* 11/2019 Batur ................ G06T 7/20
2020/0210721 A1* 7/2020 Goel ................. G06N 3/04
2021/0103781 A1* 4/2021 Vigren .............. G01S 13/867

OTHER PUBLICATIONS

Abavisani et al., "Improving the Performance of Unimodal Dynamic Hand-Gesture Recognition with Multimodal Training," The IEEE Conference on Computer Vision and Pattern Recognition (CVPR), pp. 1165-1174 (2019).
Oh et al., "Object Detection and Classification by Decision-Level Fusion for Intelligent Vehicle Systems," Sensors (Basel). 17(1): 207 (2017).

* cited by examiner

METHOD AND SENSOR APPARATUS FOR GENERATING AN OBJECT CLASSIFICATION FOR AN OBJECT

BACKGROUND

Substantial work is being performed today to improve processing and classification of sensor data. Many areas of research and development are focused on the improvement of automatic detection and classification of objects observed using various sensors including cameras, radar, ultrasonic sensors, etc. One promising technology area for solving this task is the field of artificial neural networks, including the application of technologies such as convolutional neural networks (CNN), recurrent neural network (RNN), and other similar approaches, to train and recognise objects.

Many methods have been proposed for training neural networks to recognise objects using sensor data. In a general example, a supervised learning method is applied to train an object classifier comprising a neural network to recognise a human being from an image sensor data. In the training process, the object classifier is fed labelled image data, in which each and every human being shown in the image data is labelled. This labelling may be referred to as 'ground truth' data. The image data is received by the object classifier and the object labelling is sent to a loss function calculator. The object classifier processes the image data representing the object to be classified and generates an object classification. In the loss function, a difference is determined between the output of the object classifier neural network compared to the correct value (taken from the ground truth data). The result from the loss function is then transferred to a weight adjustment function that is configured to adjust the weights used in the neural network of the object classifier. The greater the difference between the object classification and the labelling, the larger the adjustment of the weights. As the neural network is trained with more images representing human beings, the neural network becomes more and more accurate with its output of the object classification. When the object classifier is fully trained, it may be used to accurately determine an object classification using non-training image data.

To achieve a properly trained object classifier, a very large amount of labelled image data is required. Generally, hundreds of thousands or even millions of instances of labelled image data are required. This training data is very resource intensive to generate as it often requires manual labelling of the desired object classifications by a human being. For some classifications, large labelled data sets are available to buy. The most common data sets include images that are already classified. One problem with these existing data sets is that they may not be labelled with the object classes you would like to train your object classifier to recognize. Another problem with the existing data sets is that they may not use the form of input image data that you would like to run your object classification on. Yet another problem is the lack of non-image data, e.g. radar data, that is publicly available, requiring that a dataset be built over time.

The object classifier may be any type of neural network, artificial intelligence, or machine learning scheme.

SUMMARY

A first aspect of the disclosure is a method of generating an object classification for an object using an image sensor and a radar sensor, the method comprising: generating image data for the object using the image sensor, operating an image-based object classifier on the image data to generate an image-based object classification, generating radar data for the object using the radar sensor, operating a radar-based object classifier on the radar data to generate a radar-based object classification, selecting between the image-based object classification and the radar-based object classification to output as the object classification for the object, determining if a training condition is met by the radar-based object classification, and training the radar-based object classifier using the image-based object classification if the training condition is met by the radar-based object classification.

Optionally, the selecting step comprises selecting the radar-based object classification when a radar condition is met. Optionally, the radar condition is met when one or more of the following is true: a probability value of the image-based object classification is below a threshold, a probability value of the radar-based object classification is above a threshold, the image sensor is at least partially obstructed, a low light condition is determined using the image sensor, a low contrast condition is determined using the image sensor, the image sensor is determined to have an output having a low signal to noise ratio, the image data for the object is determined to be below a threshold resolution, the object is determined to be further from the image sensor than a threshold distance.

The selecting step may comprise selecting between the image-based object classification and the radar-based object classification in dependence on one or more of: a time of day, a light level, a visibility distance, a humidity level, and a weather condition.

The weather condition may be determined by an independent sensor. The radar-based object classification may comprise a radar object probability value. Optionally, the training condition is met when one or more of the following is true: the radar object probability value is below a first threshold, a probability value of the image-based object classification is above a second threshold, the image-based object classification and the radar-based object classification are substantially mismatched.

Optionally, the steps of generating image data and generating radar data are performed in parallel. Optionally, the image sensor and a radar sensor are co-located. Optionally, the image sensor and a radar sensor have an overlapping field of view. The image sensor and a radar sensor may be arranged in separate housings. The image sensor and a radar sensor may have an overlapping observable area.

A second aspect of the disclosure is an apparatus for generating an object classification for an object, the apparatus comprising an image sensor, a radar sensor, and a processing unit, the processing unit configured to perform the steps of: receiving image data for the object from the image sensor, operating an image-based object classifier on the image data to generate an image-based object classification, receiving radar data for the object from the radar sensor, operating a radar-based object classifier on the radar data to generate a radar-based object classification, selecting between the image-based object classification and the radar-based object classification to output as the object classification for the object, determining if a training condition is met by the radar-based object classification, and training the radar-based object classifier using the image-based object classification when the training condition is met by the radar-based object classification.

A third aspect of the disclosure is a method of generating an object classification for an object using one or more image sensors and one or more depth sensors, the method comprising: generating a set of image data for the object using the one or more image sensors, operating at least one image-based object classifier on the set of image data to generate a set of image-based object classifications, generating a set of depth data for the object using the one or more depth sensors, operating at least one depth-based object classifier on the set of depth data to generate a set of depth-based object classifications, selecting an object classification to output from the set of image-based object classifications and depth-based object classifications, training one of the depth-based object classifiers using at least one image-based object classification from the set of image-based object classifications when a condition is met by the depth-based object classification.

The one or more image sensors may comprise at least one of: a visible light camera, thermal camera, NIR camera, UV camera and the one or more depth sensors may comprise at least one of a radar, LIDAR, and time-of-flight camera.

BRIEF DESCRIPTION OF THE DRAWINGS

Other features and advantages will become apparent from the following detailed description of an example, with reference to the accompanying drawings, in which.

DESCRIPTION

The present description relates to apparatus and techniques for providing continuously improving object detection and classification using multiple sensor input. Throughout the description, the same reference numerals are used to identify corresponding elements.

Figure 1:
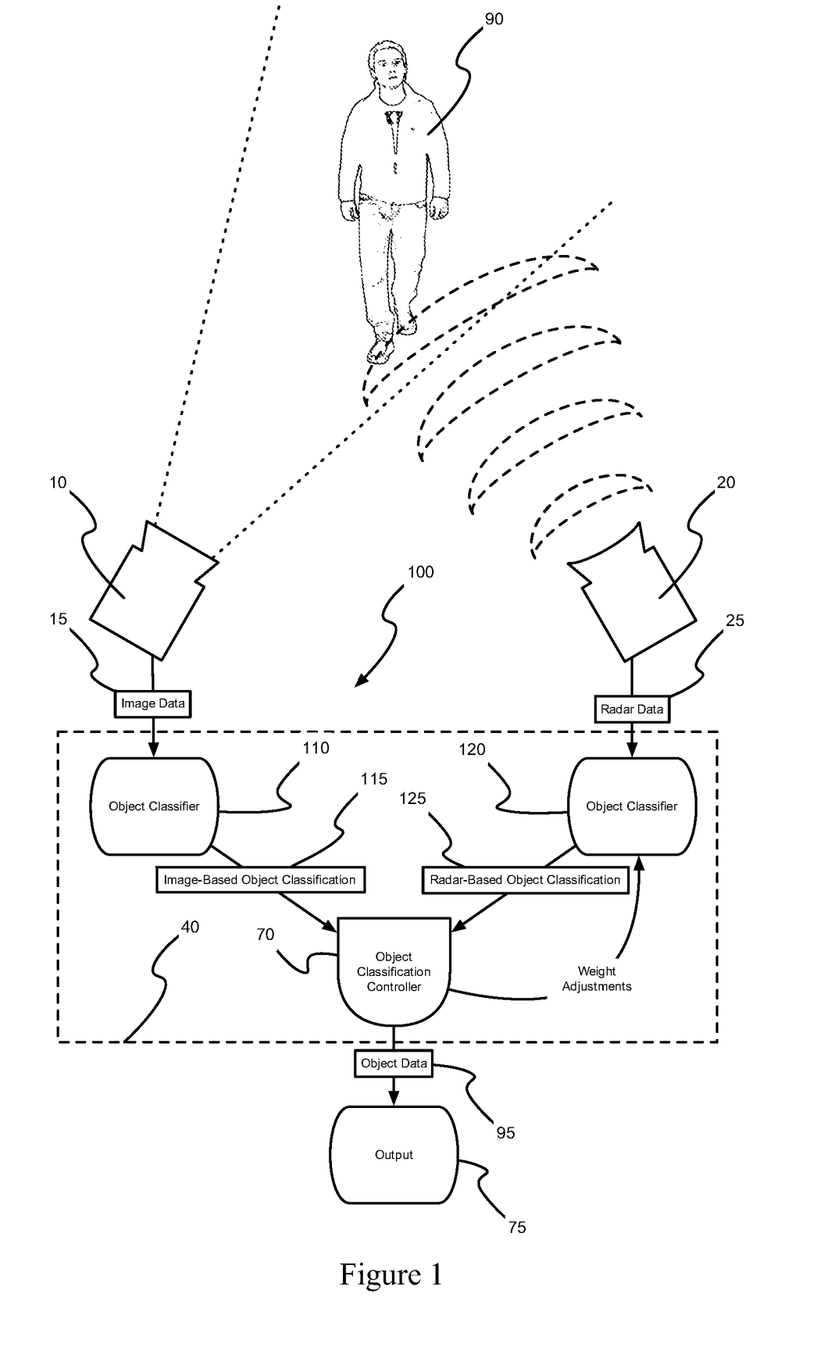
FIG. 1 is a schematic block diagram of an object classification apparatus.

FIG. 1 is a schematic block diagram of an example of an object classification apparatus 100. Apparatus 100 comprises image sensor 10, radar sensor 20, and processing unit 40. Image sensor 10 is configured to capture an image of an object 90 and provide image data 15 to processing unit 40 corresponding to the image of the object 90. Similarly, radar sensor 20 is configured to capture radar data 25 for the same object 90 and provide radar data 25 to processing unit 40 corresponding to the radar echo of the object 90. Apparatus 100 may, in some examples, be mounted to a building or vehicle for surveying a proximal space. In further examples, apparatus 100 may be mounted on a roof top, facing down along a wall, in order to monitor a façade. Apparatus 100 may also be directed skyward to detect and track drones or other flying vehicles or objects.

In this example, processing unit 40 comprises an image-based object classifier 110 configured to receive the image data 15 and determine an image-based object classification 115 of the one or more objects 90 in the image data 15. Processing unit 40 further comprises a radar-based object classifier 120 configured to receive the radar data 25 and determine a radar-based object classification 125 of the one or more objects 90 in the radar data 25. The processing unit 40 comprises an object classification controller 70 configured to receive the image-based object classification 115 and radar-based object classification 125 and select which one of the image-based object classification 115 and radar-based object classification 125 to output as object classification 95 to object classification output interface 75. In this example, where certain conditions are met, the image-based object classification 115 is used to train the radar-based object classifier 120. In this way, the radar-based object classifier 120 is continuously trained and improved using labelled data (or "ground truth" data). This enables the radar-based object classifier 120 to achieve object classification performance levels which are not possible to achieve using factory provided settings.

The processing unit 40 has been described above as a single unit but may be configured as separate controllers or modules. The separate processing units or modules can be specialized controllers for e.g. processing the videos and images, or general controllers or modules that can control more than one component. The processing unit 40, or the specialized modules or controllers, may be at least partially implemented by software executed by a central processing unit (CPU). In an example, a computer program product comprising instructions which, when the program is executed by a computer, cause the computer to carry out steps as discussed above in relation to the processing unit 40. The processing unit may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction but serve as another element/means when executing another instruction. In addition, one element/means may be implemented by one instruction in some cases, but by a plurality of instructions in some other cases. Naturally, it is conceivable that one or more elements (means) are implemented entirely by analogue hardware components.

The processing unit may include one or more processing units, e.g. a CPU ("Central Processing Unit"), a GPU ("Graphics Processing Unit"), an AI accelerator chip, a DSP ("Digital Signal Processor"), an ASIC ("Application-Specific Integrated Circuit"), a scaler, a DDIC (display driver integrated circuit), discrete analogue and/or digital components, or some other programmable logical device, such as an FPGA ("Field Programmable Gate Array"). The processing unit may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software and associated control parameter values may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The processing unit may include one or more communication interfaces, such as a serial interface, a parallel interface, a USB interface, a wireless interface, a network adapter, etc, as well as one or more data acquisition devices, such as an A/D converter. The special-purpose software may be provided to the processing unit on any suitable computer-readable medium, including a record medium, and a read-only memory.

Figure 2A:
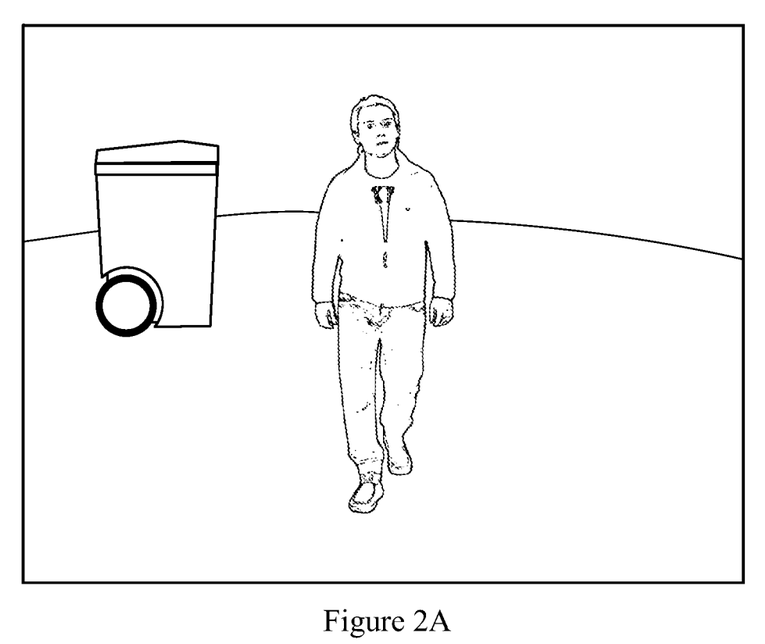
FIGS. 2A and 2B are schematic views of sensor data of a scene captured by an image sensor.

FIG. 2A is a schematic view of an image data 15 of a scene captured by an image sensor 10. Image data 15 may comprise a static image or a sequence of images, such as a video stream. The image data 15 may comprise one or a combination of a visible light image, a thermal radiation image, a near infrared (NIR) light image, an ultraviolet light image, etc. Image sensor 10 may comprise one or a combination of a visible light sensor (e.g. a semiconductor charge-coupled devices (CCD), an active pixel sensor in complementary metal-oxide-semiconductor (CMOS), or an N-type metal-oxide-semiconductor (NMOS, Live MOS) sensor), thermal radiation sensors (e.g. such as pyroelectric and ferroelectric detectors), a near infrared light sensor, or an ultraviolet light sensor. The field of view (FOV) of the image sensor 10 is defined as the angle through which the image sensor 10 can pick up electromagnetic radiation. The field of view is dependent on the size of image sensor 10 and a focal length of the lens used with image sensor 10. A horizontal field of view (HFOV) is the angle through which the image sensor 10 can pick up electromagnetic radiation in the horizontal axis and a vertical field of view (VFOV) is the angle through which the image sensor 10 can pick up electromagnetic radiation in the vertical axis.

Figure 2B:
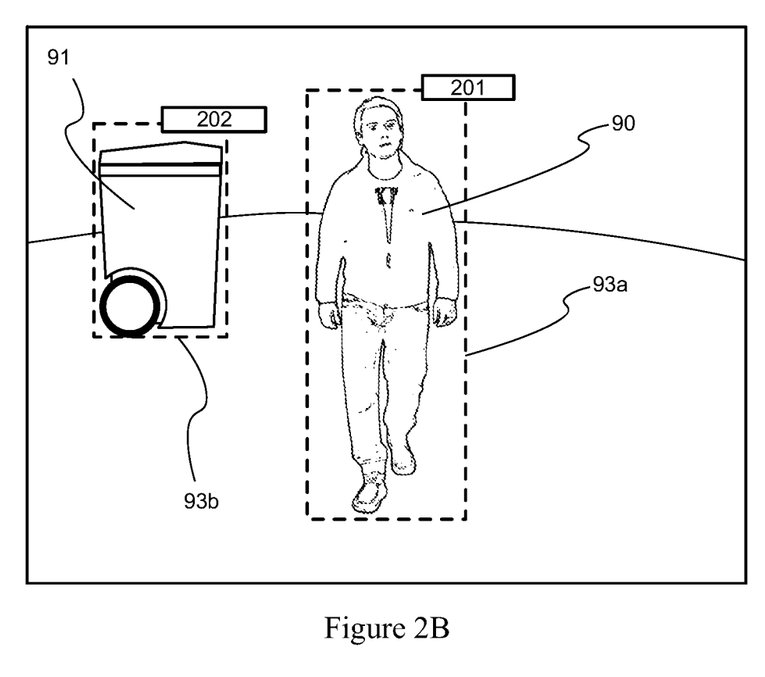

In an example of the disclosure, the image data 15 is passed to the image-based object classifier 110. FIG. 2B shows an example of the application of classification of image data 15, wherein object 90 is identified as human being 201 and object 91 is identified as dustbin 202. Object 90 and object 91 are shown with bounding boxes 93a and 93b defining the portion of the image in which they are located. Whilst FIGS. 2A and 2B show two objects 90, 91, image-based object classifier 110 may be configured to classify a larger number of objects.

Figure 3:
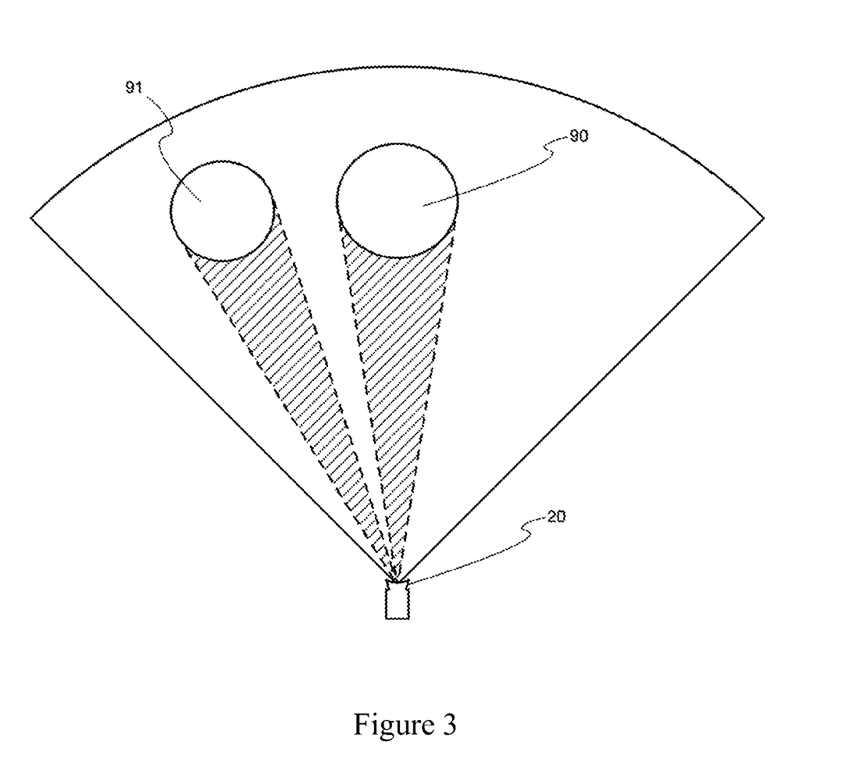
FIG. 3 is a schematic view of sensor data of the corresponding scene of FIG. 2, captured by a radar sensor.

FIG. 3 is a schematic view of sensor data of the corresponding scene of FIG. 2, captured by a radar sensor 20. Similar, to image data 15, radar data 25 may comprise a single radar image or a sequence of radar images. Radar sensor 20 is configured to emit a radio signal and detect the echo of the radio signal reflected by object(s) in the path of the radio signal. The field of view (FOV) of the radar sensor 20 is defined as the angle through which the radar sensor 20 can transmit and pick up electromagnetic radiation from the radar echo. A horizontal field of view (HFOV) is the angle through which the radar sensor 20 can transmit and pick up electromagnetic radiation from the radar echo in the horizontal axis and a vertical field of view (VFOV) is the angle through which the radar sensor 20 can transmit and pick up electromagnetic radiation from the radar echo in the vertical axis. In a typical radar configuration, the vertical field of view may be relatively small compared with the horizontal field of view. Using the analogy of pixels in an image sensor, the vertical field of view may be described as simply a single pixel high. In one example, a radar has a 120-degree HFOV and a 25-degree VFOV and is capable of resolving multiple objects in the horizontal plane using the plurality of "pixels" in the horizontal plane while only having a single "pixel" in the vertical plane.

As shown in FIG. 3, object 90 and object 91 are also imaged by the radar sensor 20. Whilst FIG. 3 shows two objects 90, 91 in the radar data 25, radar-based object classifier 120 may be configured to classify a larger number of objects.

Although described throughout the application as a radar sensor 20, it is understood that other sensor types might be used instead of the radar sensor 20. Such other sensor types might include one or more of a light detection and ranging (LIDAR) sensor, time-of-flight camera, sonar, ultrasonic, microphone or microphone array, visible light image sensor, a thermal radiation image sensor, a near infrared (NIR) light image sensor, an ultraviolet light image sensor. In some examples, any depth sensor for providing depth or distance information of the objects 90, 91 can be used instead of the radar sensor 20 with any of the examples described in reference to the figures. Depth is defined here as the FOV depth, i.e. the distance from the sensor.

Figure 4:
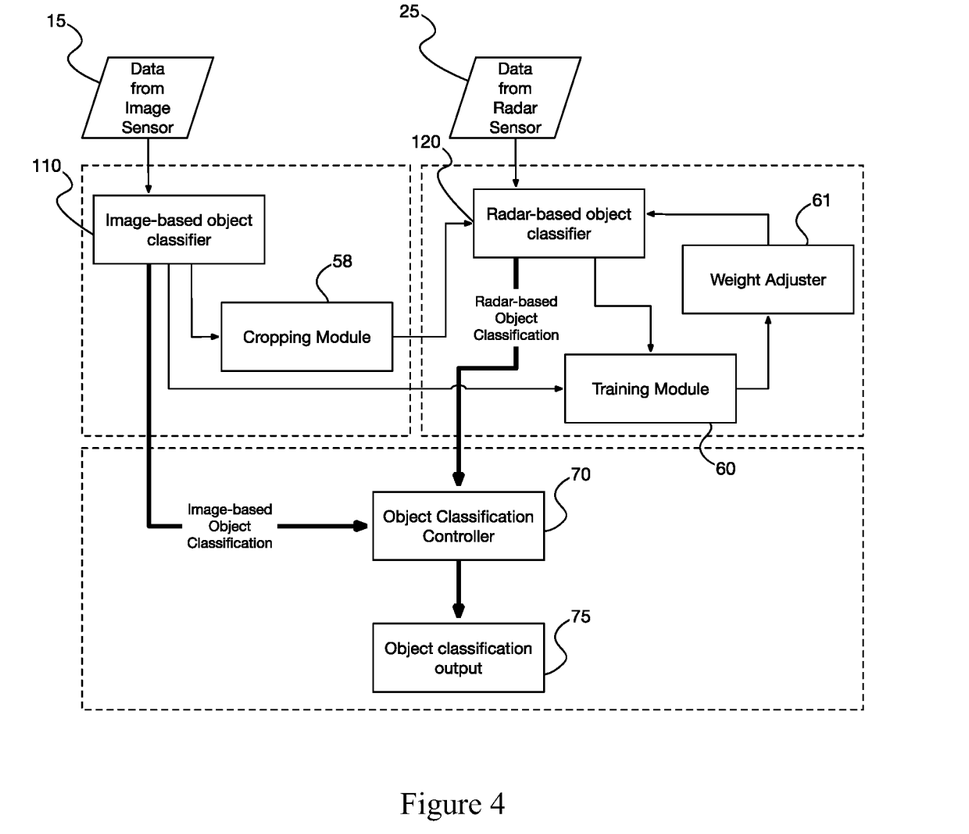
FIG. 4 is a schematic block diagram of a training system for training a classifier.

FIG. 4 is a schematic block diagram of an example of the training system for training a classifier. As described above, the training system maybe wholly or partially run on the processing unit 40. The operation of the training system will now be described in detail according to the flowchart shown in FIG. 5.

Figure 5:
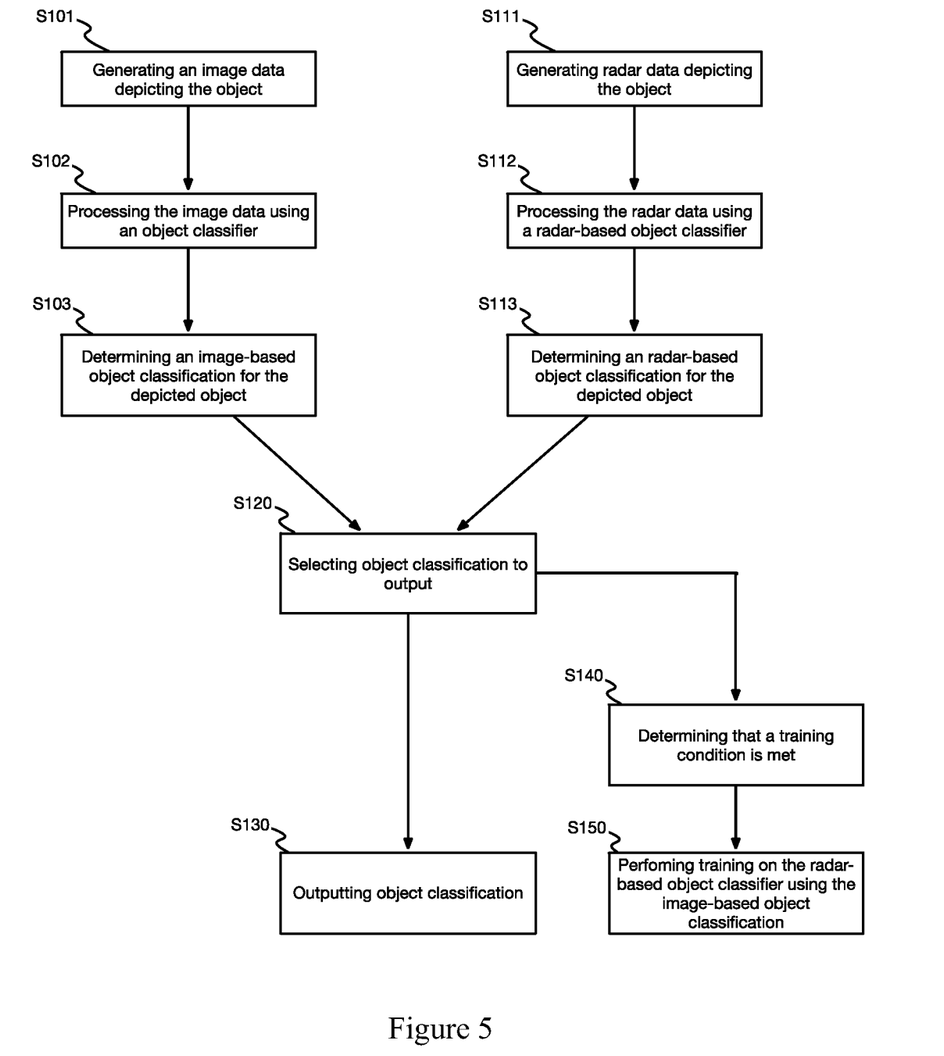
FIG. 5 is a flowchart of a classification and training process.

In step S101, image data 15 depicting object 90 is generated by image sensor 10 and passed to image-based object classifier 110.

In step S102, the image data 15 is processed by image-based object classifier 110. In one example, the image-based object classifier 110 is a neural network based classifier. In this example, the image-based object classifier 110 may have been trained using large numbers of training images with corresponding object classification label data. In an example, where the image-based object classifier 110 is needed to classify objects used in a typical security or automotive context, the training data might comprise labelled images of humans and vehicles. Further object types that may be of interest in a typical security or automotive context may include animals, bicycles, motorbikes, a comprehensive range of truck size and types. The image-based object classifier 110 can also be trained to recognize and exclude objects that may otherwise trigger false alarms. Such object types may include flags moving in the wind, moving shadows, light flares etc. In one example, the training data comprises labelled images for any combination of the above.

In step S103, image-based object classifier 110 generates an image-based object classification 115 for the object 90 depicted in the image data 15. The image-based object classification 115 is a classification of object 90 to one of a number of objects that the image-based object classifier 110 is trained to recognise. Image-based object classification 115 may comprise at least one of: an object type, an object size, a bounding zone (e.g. a bounding box, bounding contour, or bounding volume describing the portion of the image data containing the classified object), an object vector describing the movement of the object such as velocity and/or acceleration of the object, an object pixel resolution, an object distance, an object spatial co-ordinate(s), or a probability value indicating a likelihood that the image-based object classifier 110 has determined the image-based object classification 115 variables correctly. In another example, image-based object classification 115 may comprise more descriptive features of objects 90 and 91 e.g. histograms of individual RGB channels contained by the bounding zone. The probability value may be a single probability value indicative of the reliability of the entire classification or one or more probability values indicative of the reliability of each of the image-based object classification 115 variables.

In an optional step (not shown), an optional cropping module 58 receives data from the image-based object classifier 110 and generates a corresponding cropping data. This cropping data may comprise the size and position of the object(s) classified by the image-based object classifier 110. The cropping data may then be passed to the radar-based object classifier 120 and can be used by radar-based object classifier 120 to more accurately classify the one or more objects identified in the radar echo. Reference may here be made to Applicant's copending European patent application 18174974.8 for a more detailed description of a possible way of mapping between image data and radar data.

In step S111, radar data 25 depicting object 90 is generated by radar sensor 20 and passed to radar-based object classifier 120.

In step S112, the radar data 25 is processed by radar-based object classifier 120. In one example, the radar-based object classifier 120 is a neural network based classifier. In this example, similar to the image-based object classifier 110 described above, the radar-based object classifier 120 may have been trained using large numbers of training images with corresponding object classification label data. Preferably, the radar-based object classifier 120 is trained to classify objects using the same set of objects as the image-based object classifier 110 to ensure the best possible correlation between the classifications generated by the image-based object classifier 110 and the radar-based object classifier 120. Radar-based object classification 125 may comprise at least one of: an object type, an object size, a bounding box describing the portion of the radar data containing the classified object, an object vector describing the movement of the object such as velocity and/or acceleration of the object, an object radar image resolution, an object distance, an object spatial co-ordinate(s), or a probability value indicating a likelihood that the radar-based object classifier 120 has correctly determined the radar-based object classification 125 variables. In another example, radar-based object classification 125 may comprise more descriptive features of objects 90 and 91 e.g. histograms of radial velocities from all individual detections associated with an object. The probability value may be a single probability value indicative of the reliability of the entire classification, or one or more probability values indicative of the reliability of each of the radar-based object classification 125 variables.

In step S113, radar-based object classifier 120 generates a radar-based object classification 125 for the object 90 depicted in the radar data 25. The radar-based object classification 125 is a classification of object 90 to one of a number of objects that the radar-based object classifier 120 is trained to recognise.

In step S120, object classification controller 70 receives image-based object classification 115 and radar-based object classification 125. Object classification controller 70 then determines which of the image-based object classification 115 and radar-based object classification 125 to pass to the object classification output interface 75.

In some examples, the determination of which of the image-based object classification 115 and radar-based object classification 125 to pass to the object classification output 75 can be made in dependence on a low light condition. Processing unit 40 may be configured to determine that the environment observed by image sensor 10 is a low light environment, e.g. unlit indoor environment or outdoor dusk/dawn/night time environment. This condition may be determined through analysis of the image data 15 to determine a low light level across all or a substantial part of the image. In one example, an average brightness value of each pixel of the image data 15 in a single or multiple frames may be determined. This average brightness value may be used in a function by the object classification controller 70 to determine which of the object classifications to output. A function may comprise one or more input variables, include one or more of those described in this description. Alternatively, the average brightness value may be compared with a threshold value. The result of the comparison with the threshold value may be used directly to determine which of the image-based object classifications to output, or the result of the comparison may be used in a function used to determine which of the object classifications to output.

In one example, a low light environment may be determined using a determination of light levels using a separate light sensor or signal indicating a low light level.

A generally well-lit scene may still comprise objects hidden by shadow. Therefore, in another example, a determination of a low light condition may only be made with respect to the objects classified by the image-based object classifier 110, while partially or entirely ignoring the lighting conditions of the rest of the observed scene. In one example, an average brightness value of each pixel of the classified object (e.g. item 202 of FIG. 2B) in a single or multiple frames maybe determined and used directly in a function or as compared with a threshold value to determine which of the object classifications to output. The average brightness value of each pixel of the classified object may be determined through analysis of the pixels within the bounding box defined by image-based object classifier 110 for the object.

Similar to the above example, processing unit 40 may be configured to determine that the environment observed by image sensor 10 is a low contrast environment, e.g. poorly lit or partially obscured by fog or smoke, or circumstances in which the image sensor 10 is saturated by sunlight. This condition may be determined through analysis of the image data 15 to determine a low contrast level across all or a substantial part of the image. In one example, an average contrast value of the image data 15 in a single or multiple frames maybe determined. This average contrast value may be used in a function by the object classification controller 70 to determine which of the object classifications to output. Alternatively, the average contrast value may be compared with a threshold value. The result of the comparison with the threshold value may be used directly to determine which of the object classifications to output. Alternatively, the result of the comparison may be used in a function used to determine which of the object classifications to output.

A generally high contrast scene may still comprise objects hidden by shadow or smoke.

Therefore, in another example, a determination of a low contrast condition may only be made with respect to the objects classified by the image-based object classifier 110, while partially or entirely ignoring the contrast of the rest of the observed scene. In one example, an average contrast value of each pixel of the classified object (e.g. item 202 of FIG. 2B) in a single or multiple frames maybe determined and used directly in a function or as compared with a threshold value to determine which of the object classifications to output. This approach may be useful even for edge cases such as when an object is fully or partially occluded by a material that is opaque to visible light, but transparent to radar, e.g. a tarpaulin or a tent.

Although an image sensor will generally return an image of a fixed resolution, the resolution of classified objects may vary significantly depending on their distance from the image sensor. Therefore, in one example, an object resolution value of the observed object 90 may be used to determine which of the object classifications to output. The object resolution value will usually be determined for the objects classified by the image-based object classifier 110. In one example, an object resolution value is based on the number of pixels within the bounding box 93b of the classified object (e.g. item 202 of FIG. 2B) in a single or multiple frames maybe determined and used in a function or as compared with a threshold value to determine which of the object classifications to output.

In an example similar to the above example describing that the object distance was used to determine which of the object classifications to output, the object distance may be directly measured and used using the radar sensor 20. Therefore, in one example, an object distance value of the observed object may be used to determine which of the object classifications to output. The object distance value will usually be determined for the objects classified by the image-based object classifier 110. In one example, an object distance value is based on the distance of the object as determined by the radar sensor 20 and/or radar-based object classifier 120 (e.g. object 91 of FIG. 3) in a single or multiple frames. The object distance value may then be used by the object classification controller 70 in a function or as compared with a threshold value to determine which of the object classifications to output.

In one example, a combination of object distance and object contrast may be used to determine visibility distance. Where an object 90 can be observed by the radar sensor 20 and radar-based object classifier 120 at a certain distance but cannot be resolved using the image sensor 10 and image-based object classifier 110, it may be determined by the processing unit 40 that the visibility distance is less than the distance of the object 90. This visibility calculation can be used by the object classification controller 70 to determine which of the object classifications to output for both the object 90 and other objects assessed by object classification controller 70.

For outdoor scenes, light levels can be at least partially predicted by the position of sun in the sky. Therefore, in one example, a time value may be used to determine which of the object classifications to output. In one example, a time value, optionally combined with a location value, is used by the object classification controller 70 in a function or as compared with a threshold value to determine which of the object classifications to output.

In one example, when a water drop is covering part of the field of view of the image sensor, the presence and location of the water drop may be detected algorithmically. The presence and location of the water drop may then be used by the object classification controller 70 in a function or as compared with a threshold value to determine which of the object classifications to output.

Certain environmental conditions can result in a substantially degraded radar image. For example, certain radiation sources can disrupt a radar image. In one example, an electromagnetic interference level is determined using an optional electromagnetic interference sensor (not shown) and used by the object classification controller 70 in a function or as compared with a threshold value to determine which of the object classifications to output. In another example, heavy rain or hail may be detected using a rain, moisture, humidity, or hail sensor. Given that heavy rain or hail can degrade a radar image, a determination of heavy rain or hail may be used by the object classification controller 70 in a function or as compared with a threshold value to determine which of the object classifications to output.

In one example, one or both of the image-based object classifier 110 probability value and radar-based object classifier 120 probability value are used by the object classification controller 70 in a function or as compared with a threshold value to determine which of the object classifications to output. In the present description, a probability value is a probability value generated by the respective classifier for the detected object. In one example, a classifier may determine, from an input image, a set of possible object classifications with corresponding probability values. In this example, for each object, the classifier may be configured to output the object classification with the highest probability value along with the corresponding probability value.

In one example, object classifications are provided by the image-based object classifier 110 and radar-based object classifier 120 and the object classification with the largest probability value is selected by object classification controller 70. In one example, the image-based object classification 115 is always output unless the image-based object classification 115 probability value drops below a certain threshold, at which point the radar-based object classification 125 is only output if radar-based object classification 125 probability value is above a certain threshold.

In some examples, the threshold for image-based object classifier 110 probability value and radar-based object classifier 120 probability value is 66.7% which corresponds to one standard deviation from the mean. In some examples, the threshold for the image-based object classifier 110 probability value and radar-based object classifier 120 probability value is 95% which corresponds to two standard deviations from the mean. In some other examples, the threshold for the image-based object classifier 110 probability value and radar-based object classifier 120 probability value is 99.7% which corresponds to three standard deviations from the mean. Probability values lying outside of one or more standard deviations (i.e. below the above thresholds) may be used to determine that the detected object is an anomaly and not to be used by the system for object detection and/or to be used for training. In some other examples, the threshold for image-based object classifier 110 probability value and radar-based object classifier 120 probability value can be any suitable threshold for providing good object classification. In some further examples, the threshold for the image-based object classifier 110 probability value and radar-based object classifier 120 probability value can be dynamically varied dependent on the object classification output interface 75.

In step S130, object classification controller 70 then passes the selected object classification to the object classification output interface 75 for use by a second system (not shown). The second system may be a host system of which apparatus 100 is a sub-component. Alternatively, the second system may be a remote system, to which the apparatus 100 is connected via a network.

In step S140, training module 60 receives image-based object classification 115 and radar-based object classification 125. Training module 60 then determines whether a training action should be carried out. The principle for selecting when a training action should be carried out is generally that of determining that the image-based object classification 115 is sufficiently reliable to be used as 'ground truth' data for training the radar-based object classifier 120. Where this is not the case, any training of the radar-based object classifier 120 could be damaging to the performance of the radar-based object classifier 120. For example, where the radar-based object classifier 120 is repeatedly trained using incorrect image-based object classifications, perhaps caused by visual artefacts, the radar-based object classifier 120 will eventually be unable to reliably discern between real and non-existent objects.

In one example, one or both of the image-based object classifier 110 probability value and radar-based object classifier 120 probability values are used by the training module 60 to determine whether to carry out a training action, to train the radar-based object classifier 120 using the image-based object classification 115 in combination with the radar data 25.

In one example, the training action is always carried out when the image-based object classification 115 probability value is above a certain threshold. In another example, the training action is always carried out when the image-based object classification 115 probability value is above a certain threshold and the radar-based object classification 125 probability value is below a certain threshold. In some examples, no training is carried out when the image-based object classification 115 and the radar-based object classification 125 are substantially matched. The image-based object classification 115 and the radar-based object classification 125 may be substantially matched where at least the object type of both classifications are the same. In some examples, training is always carried out where the radar-based object classifier 120 was unable to classify any objects in radar data 25. In other examples, training is carried out where the radar-based object classifier 120 was unable to classify any objects in radar data 25 and image-based object classification 115 probability value is above a certain threshold.

In some examples, the determination of whether to carry out the training action is made in dependence on at least one of the following variables of the image-based object classification 115 or radar-based object classification 125: an object type, an object size, an object movement vector, an object radar resolution, an object distance, an object spatial co-ordinate(s), histograms of individual RGB channels contained by the bounding zone, histograms of radial velocities from all individual detections associated with an object.

In some examples, the determination of whether to carry out the training action is determined in dependence on the size of the object. Where the object is too small or too large to be reliable resolved by the image-based object classifier 110 or radar-based object classifier 120, no training is carried out. e.g. where the object is a small animal.

In some examples, the determination of whether to carry out the training action is determined in dependence on the type of the object. Where the object has an optical or radar profile such that profile cannot be reliable resolved by the image-based object classifier 110 or radar-based object classifier 120 respectively, no training is carried out. e.g. where the object is determined to be a smoke column.

Similar to the above, in some examples, the determination of whether to carry out the training action is determined in dependence on the available radar resolution of the object. Where the object is too distant or small to be reliable resolved by the radar-based object classifier 120, no training is carried out.

In some examples, the determination of whether to carry out the training action is determined on the movement of the object. Where the object is moving too quickly to be reliably resolved by the image-based object classifier 110 or radar-based object classifier 120, no training is carried out. e.g. where the object is a flying bird.

In some examples, the determination of whether to carry out the training action is determined on the position of the object. Where the object is located at a position that is outside an area of interest for apparatus 100, no training is carried out. e.g. all objects not on the ground might be ignored by the system.

In some examples, the determination of whether to carry out the training action is made in dependence on at least one of the following variables of the image data 15: an image quality indicator, or an image signal to noise ratio. Where the processing unit 40 determines that an image quality indicator or an image signal to noise ratio indicates a poor quality image, no training is carried out to avoid training radar-based object classifier 120 with low quality data. i.e. radar-based object classifier 120 is not trained unless a reliable classification from the image-based classifier 110 can be provided. i.e. the 'ground truth' is trustworthy.

In step S150, after a determination is made that a training action should be carried out, the image-based object classification 115 is used in combination with the radar data 25 to train the radar-based object classifier 120 to better recognise objects of the type identified in the image-based object classification 115. A loss function is calculated to determine the difference between the radar-based object classification 125, determined by the neural network of radar-based object classifier 120, and the image-based object classification 115. This loss function is used by weight adjuster 61 to generate the appropriate weight adjustments for the neural network of the radar-based object classifier 120. These weight adjustments are applied to the neural network of the radar-based object classifier 120, improving the ability of the radar-based object classifier 120 to recognise objects of the type identified in image-based object classification 115. In this way, the ability of the radar-based object classifier 120 to correctly classify the same objects as the image-based object classifier 110 incrementally improves over time. This is known as 'incremental learning'. This allows a continuously improving ability of the radar-based object classifier 120 to correctly classify objects when conditions prevent the image-based object classifier 110 from doing so.

In some examples, the weight adjuster 61 generates the weight adjustments for the neural network of the radar-based object classifier 120 in dependence on the probability value from the image-based object classification 115. Where the probability value of the image-based object classification 115 is high, the weight adjustments for the neural network of the radar-based object classifier 120 can be larger, to ensure a more significant adjustment to the neural network. Where the probability value of the image-based object classification 115 is low, the weight adjustments for the neural network of the radar-based object classifier 120 can be small, to limit the potential negative effect of a bad classification on the neural network radar-based object classifier 120.

Figure 6:
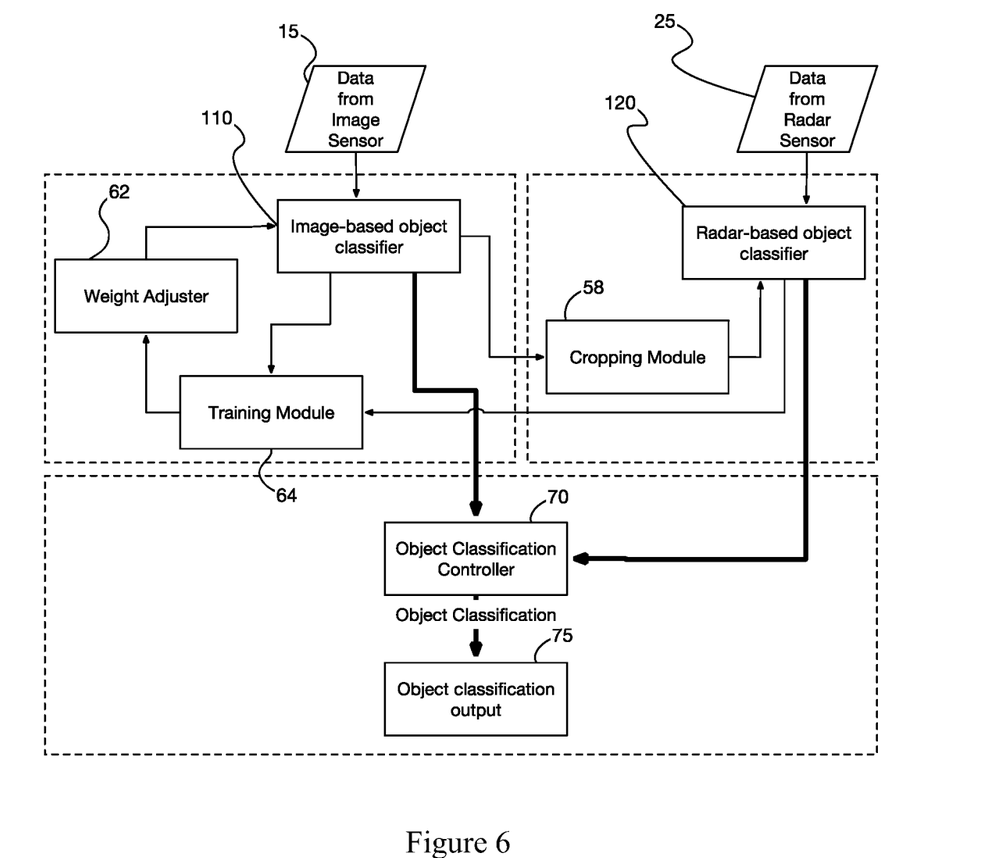
FIG. 6 is a schematic block diagram of another training system for training a classifier.

FIG. 6 is a flowchart of a classification and training process in an alternative example. In this example, training module 64 and weight adjuster 62 are switched to the side of the image-based object classifier 110.

In the example of this system, training module 64 receives image-based object classification 115 and radar-based object classification 125. Training module 64 then determines whether a training action should be carried out. After a determination is made that a training action should be carried out, the radar-based object classification 125 is used in combination with the image data 15 to train the image-based object classifier 110 to better recognise objects of the type identified in the radar-based object classification 125. A loss function is calculated to determine the difference between the image-based object classification 115, determined by the image-based object classifier 110, and radar-based object classification 125. This loss function is used by weight adjuster 62 to generate the appropriate weight adjustments for the neural network of the image-based object classifier 110. These weight adjustments are applied to the neural network of the image-based object classifier 110, improving the ability of the image-based object classifier 110 to recognise objects of the type identified in radar-based object classification 125. In this way, the ability of the image-based object classifier 110 to correctly classify the same objects as the radar-based object classifier 120 improves.

This allows an improved ability of the image-based object classifier 110 to correctly classify objects when conditions prevent the radar-based object classifier 120 from doing so. This can be used to improve very low light performance of image-based object classifier 110 when the radar data 25 is compromised by electromagnetic interference or other environmental conditions.

Figure 7:
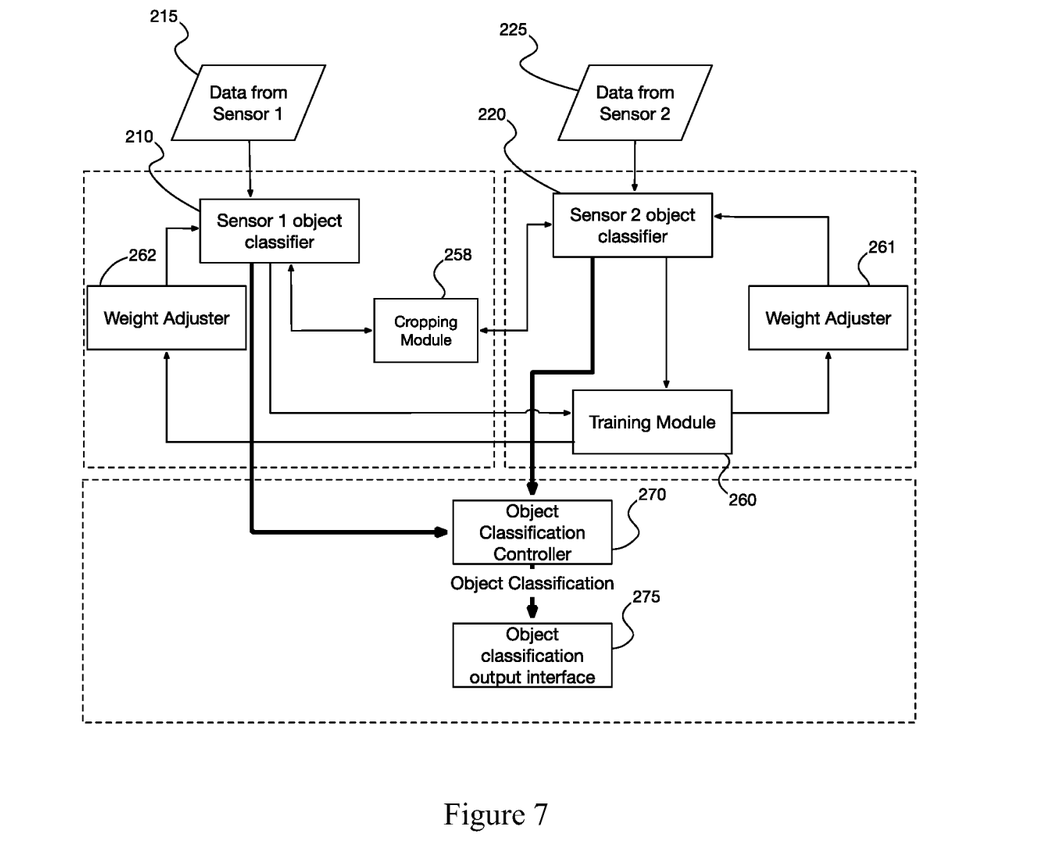
FIG. 7 is a schematic block diagram of a classification and training process in an alternative example.

FIG. 7 is a flowchart of a classification and training process in an alternative example. FIG. 7 provides a generalised example of the examples of FIG. 4 and FIG. 6, where a first object classifier 210 and/or a second object classifier 220 can be trained.

Data 215 from sensor 1 depicting object 90 is generated and passed to the first object classifier 210, where data 215 is processed. The second object classifier 210 then generates a sensor 1 object classification for the object 90 depicted in the data 215. The sensor 1 object classification is then passed to object classification controller 270. Subsequently or in parallel, data 225 from sensor 2 depicting object 90 is generated and passed to the second object classifier 220, where data 225 is processed. The second object classifier 220 then generates a sensor 2 object classification for the object 90 depicted in the data 225. The sensor 1 object classification is then passed to object classification controller 270. Object classification controller 270 selects between the sensor 1 object classification and sensor 2 object classification and passes the selected object classification to the object classification output interface 275 for use by a second system. Training module 260 receives sensor 1 object classification and sensor 2 object classification and determines whether one or more training actions should be carried out. A determination of whether a training action should be carried may be made according to any of the principles described in examples above. Where a determination is made that a training of the first object classifier 210 will be carried out, a loss function is calculated to determine the difference between the sensor 1 object classification, determined by the first object classifier 210, and sensor 2 object classification. This loss function is used by weight adjuster 262 to generate the appropriate weight adjustments for the neural network of the object classifier 210. These weight adjustments are applied to the neural network of the object classifier 210, improving the ability of the object classifier 210 to recognise objects of the type identified in the sensor 2 object classification. Optionally, training module 260 may be configured to determine that a training of object classifier 220 will be carried out. In this case, a loss function is calculated to determine the difference between the sensor 2 object classification, determined by the object classifier 220, and sensor 1 object classification. This loss function is used by optional weight adjuster 261 to generate the appropriate weight adjustments for the neural network of the object classifier 220. These weight adjustments are applied to the neural network of the object classifier 220, improving the ability of the object classifier 220 to recognise objects of the type identified in the sensor 1 object classification.

Sensor 1 may comprise one or more of the following sensor types: radar sensor, light detection and ranging (LIDAR) sensor, time-of-flight camera, sonar, ultrasonic, visible light image, a thermal radiation image, a near infrared (NIR) light image, an ultraviolet light image. Similarly, sensor 2 may comprise one or more of the following sensor types: radar sensor, light detection and ranging (LIDAR) sensor, time-of-flight camera, sonar, ultrasonic, visible light image, a thermal radiation image, a near infrared (NIR) light image, an ultraviolet light image.

In one example, sensor 1 and sensor 2 are contained in a common housing. In this example, sensor 1 and sensor 2 may be comprised of the same integrated circuit. This ensures that a FOV of sensor 1 and sensor 2 are substantially matched, having a substantially common FOV origin (i.e. sensor position). In one example, the FOV of sensor 1 and sensor 2 are overlapping, ensuring that a portion of physical space is observed by both sensors at the same time. FIG. 2A and FIG. 2B provide an example of 2 sensors providing an overlapping field of view in which both object 91 and object 92 can be resolved by each sensor.

In one example, sensor 1 and sensor 2 are not contained in a common housing but still provide an overlapping observable area, where the observable area is defined as the physical space observed by each sensor. This may be enabled by directing both sensor 1 and sensor 2 towards the same physical space, even where the sensors are physically separated.

The invention claimed is:

1. A method of generating an object classification for an object localized in first and second images of objects captured using a light imaging sensor and a radar sensor respectively, the method comprising:
   generating image data for the object localized in the first image of the objects captured using the light imaging sensor,
   operating an image-based object classifier on the image data to generate an image-based object classification of the object localized in the first image of the objects;
   generating radar data corresponding to an echo reflected from the object localized in the second image of the objects captured using the radar sensor,
   operating a radar-based object classifier on the radar data to generate a radar-based object classification of the object localized in the second image of the objects,
   selecting between the image-based object classification and the radar-based object classification to output as the object classification for the object;
   determining if a training condition is met by the radar-based object classification, and
   training the radar-based object classifier using the image-based object classification if the training condition is met by the radar-based object classification;
   wherein the object is one of a human, animal, or vehicle.

2. The method of claim 1, wherein the selecting step comprises selecting the radar-based object classification when a radar condition is met.

3. The method of claim 2, wherein the radar condition is met when a probability value of the image-based object classification is below a threshold.

4. The method of claim 3, wherein the radar condition is only met when a probability value of the radar-based object is above a threshold.

5. The method of claim 2, wherein the radar condition is met when the image sensor is at least partially obstructed.

6. The method of claim 2, wherein the radar condition is met when a low light condition is determined using the image sensor.

7. The method of claim 2, wherein the radar condition is met when a low contrast condition is determined using the image sensor.

8. The method of claim 2, wherein the radar condition is met when the image sensor is determined to have an output having a low signal to noise ratio.

9. The method of claim 1, wherein the selecting step comprises selecting between the image-based object classification and the radar-based object classification in dependence on one or more of a time of day, a light level, a visibility distance, a humidity level, and a weather condition.

10. The method of claim 9, wherein the time of day, a light level, a visibility distance, a humidity level, and/or weather condition is determined by an independent sensor.

11. The method of claim 1, wherein the radar-based object classification comprises a radar object probability value.

12. The method of claim 11, wherein the training condition is met when the radar object probability value is below a first threshold.

13. The method of claim 12, wherein the training condition is only met when a probability value of the image-based object classification is above a second threshold.

14. The method of claim 1, wherein the training condition is met when the image-based object classification and the radar-based object classification are substantially mismatched.

15. An apparatus for generating an object classification for an object of a plurality of objects comprising:
 a light imaging sensor;
 a radar sensor; and
 a processor, the processor configured to:
  receive image data corresponding to the object localized by a bounding box in a first image of the objects captured by the light imaging sensor;
  operate an image-based object classifier on the image data to generate an image-based object classification;
  receive radar data corresponding to an echo reflected from the object in a second image of the objects captured by the radar sensor;
  operate a radar-based object classifier on the radar data to generate a radar-based object classification;
  select between the image-based object classification and the radar-based-object classification to output as the object classification for the object;
  determine if a training condition is met by the radar-based object classification; and
  train the radar-based object classifier using the image-based object classification when the training condition is met by the radar-based object classification;
  wherein the object is at least one of a human, animal, or vehicle.

16. The method of claim 1 wherein:
 the image-based object classifier is a neural network based classifier; and
 the radar-based object classifier is a neural network based classifier.

17. The method of claim 16 wherein the selecting between the image-based object classification and the radar-based object classification to output as the object classification for the object is performed automatically.

18. The apparatus of claim 15 wherein:
 the image-based object classifier is a neural network based classifier; and
 the radar-based object classifier is a neural network based classifier.

19. The apparatus of claim 18 wherein the processor is configured to select between the image-based object classification and the radar-based-object classification to output as the object classification for the object automatically.

* * * * *